(12) United States Patent
Ferren et al.

(10) Patent No.: US 7,806,339 B2
(45) Date of Patent: Oct. 5, 2010

(54) EMBEDDED IDENTIFIERS

(75) Inventors: Bran Ferren, Beverly Hills, CA (US);
Edward K. Y. Jung, Bellevue, WA (US);
Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1755 days.

(21) Appl. No.: 10/802,106

(22) Filed: Mar. 16, 2004

(65) Prior Publication Data

US 2005/0206500 A1    Sep. 22, 2005

(51) Int. Cl.
*G06K 19/06* (2006.01)

(52) U.S. Cl. ...................................... 235/490

(58) Field of Classification Search ................. 235/487, 235/489, 494, 490
See application file for complete search history.

(56) References Cited

U.S. PATENT DOCUMENTS

| | | | |
|---|---|---|---|
| 3,860,796 A * | 1/1975 | Wallace et al. | 235/493 |
| 4,449,042 A * | 5/1984 | Hampson et al. | 235/454 |
| 4,625,101 A * | 11/1986 | Hinks et al. | 235/462.01 |
| 4,826,713 A * | 5/1989 | Cook | 428/31 |
| 4,929,402 A | 5/1990 | Hull | |
| 5,028,769 A * | 7/1991 | Claypool et al. | 235/454 |
| 5,109,589 A | 5/1992 | Cramer et al. | |
| 5,296,691 A * | 3/1994 | Waldron et al. | 235/462.12 |
| 5,481,102 A * | 1/1996 | Hazelrigg, Jr. | 235/487 |
| 5,684,713 A | 11/1997 | Asada et al. | |
| 5,755,072 A | 5/1998 | Lingafelter | |
| 6,249,600 B1 | 6/2001 | Reed et al. | |
| 6,405,095 B1 | 6/2002 | Jang et al. | |
| 6,460,594 B1 | 10/2002 | Lam | |
| 6,575,218 B1 | 6/2003 | Burns et al. | |
| 6,623,681 B1 | 9/2003 | Taguchi et al. | |
| 6,623,687 B1 | 9/2003 | Gervasi et al. | |
| 6,633,789 B1 | 10/2003 | Nikolskiy et al. | |
| 6,654,656 B2 | 11/2003 | Kesavadas et al. | |

(Continued)

OTHER PUBLICATIONS

CADCAM Net, An Information Service of CAD/CAM Publishing; "Applications—How Rapid Prototyping Is Used in Manufacturing, Medicine, Art, and Architecture," http://www.cadcamnetcorn/Sections/rapid%20prototyping/Applications.htm; printed on Mar. 4, 2004, pp. 1-6.

(Continued)

*Primary Examiner*—Jamara A Franklin
(74) *Attorney, Agent, or Firm*—Suiter Swantz pc llo

(57) ABSTRACT

A manufactured item includes an outer part including at least one outer material; and an identifier including at least one three-dimensional configuration corresponding to the identifier, the at least one three-dimensional configuration being embedded within the outer part. The three-dimensional configuration includes at least one of (1) a substantially empty cavity in the at least one outer material, and (2) at least one identifying material filling at least part of a cavity in the at least one outer material. Where at least one identifying material fills at least part of a cavity in the at least one outer material, the at least one outer material is substantially opaque to visible light. The item may be manufactured using one of the processes generally known as rapid prototyping, but other manufacturing processes may be used as well. Methods for making the item and for making a computer-readable representation of the item are also disclosed.

48 Claims, 7 Drawing Sheets

U.S. PATENT DOCUMENTS

| | | |
|---|---|---|
| 6,671,866 B2 | 12/2003 | Arsintescu |
| 6,691,764 B2 | 2/2004 | Embert et al. |
| 6,701,390 B2 | 3/2004 | Ehmann |
| 6,701,491 B1 | 3/2004 | Yang |
| 6,701,652 B1 * | 3/2004 | McElhatton et al. .......... 40/615 |
| 6,704,694 B1 | 3/2004 | Basdogan et al. |
| 6,807,290 B2 | 10/2004 | Liu et al. |
| 6,867,769 B1 | 3/2005 | Toriya et al. |
| 6,868,347 B2 | 3/2005 | Li et al. |
| 6,905,391 B2 | 6/2005 | Soto et al. |
| 6,915,178 B2 | 7/2005 | O'Brien et al. |
| 6,976,627 B1 * | 12/2005 | Culp et al. ............. 235/462.01 |
| 7,013,191 B2 | 3/2006 | Rubbert et al. |
| 7,029,275 B2 | 4/2006 | Rubbert et al. |
| 7,044,373 B1 | 5/2006 | Garber et al. |
| 7,075,531 B1 | 7/2006 | Ando et al. |
| 7,609,290 B2 * | 10/2009 | McEwan ..................... 348/36 |
| 2001/0029440 A1 | 10/2001 | Kondo |
| 2001/0056309 A1 | 12/2001 | Jain et al. |
| 2002/0010526 A1 | 1/2002 | Ando et al. |
| 2002/0012454 A1 | 1/2002 | Liu et al. |
| 2002/0115373 A1 | 8/2002 | Lazerman |
| 2002/0120356 A1 | 8/2002 | Takahashi et al. |
| 2002/0147521 A1 | 10/2002 | Mok et al. |
| 2002/0186216 A1 | 12/2002 | Baumberg et al. |
| 2002/0193047 A1 | 12/2002 | Weston |
| 2003/0136850 A1 | 7/2003 | Yamagishi et al. |
| 2003/0218607 A1 | 11/2003 | Baumberg |
| 2004/0002841 A1 | 1/2004 | Mayuzumi et al. |
| 2005/0043835 A1 | 2/2005 | Christensen |
| 2005/0068182 A1 * | 3/2005 | Dunlap et al. ............ 340/572.8 |
| 2006/0004476 A1 | 1/2006 | Ferren et al. |
| 2006/0025878 A1 | 2/2006 | Ferren et al. |
| 2007/0148599 A1 * | 6/2007 | True .......................... 430/311 |

OTHER PUBLICATIONS

Castle Island Company; "Castle Island's Worldwide Guide to Rapid Prototyping"; http://www.home.att.net/~castleisland/; printed on Mar. 4, 2004, pp. 1-3.

Palm, William; "Rapid Prototyping" from Penn State Learning Factory; http://www.me.psu.edu/lamancusa/rapidpro/primer/chapter2.htm; printed on Mar. 4, 2004, pp. 1-15.

U.S. Appl. No. 10/909,132, Ferren et al.

U.S. Appl. No. 10/911,819, Ferren et al.

U.S. Appl. No. 10/884,760, Ferren et al.

U.S. Appl. No. 10/892,974, Ferren et al.

U.S. Appl. No. 10/892,775, Ferren et al.

PCT International Search Report from International Application No. PCT/US05/22883 dated Aug. 1, 2008 (4 pages total ).

PCT International Search Report; International App. No. PCT/US05/08531; Jul. 1, 2008; pp. 1-3.

PCT International Search Report; International App. No. PCT/US05/08407; Jun. 25, 2008; pp. 1-3.

U.S. Appl. No. 12/592,217, Ferren et al.

* cited by examiner

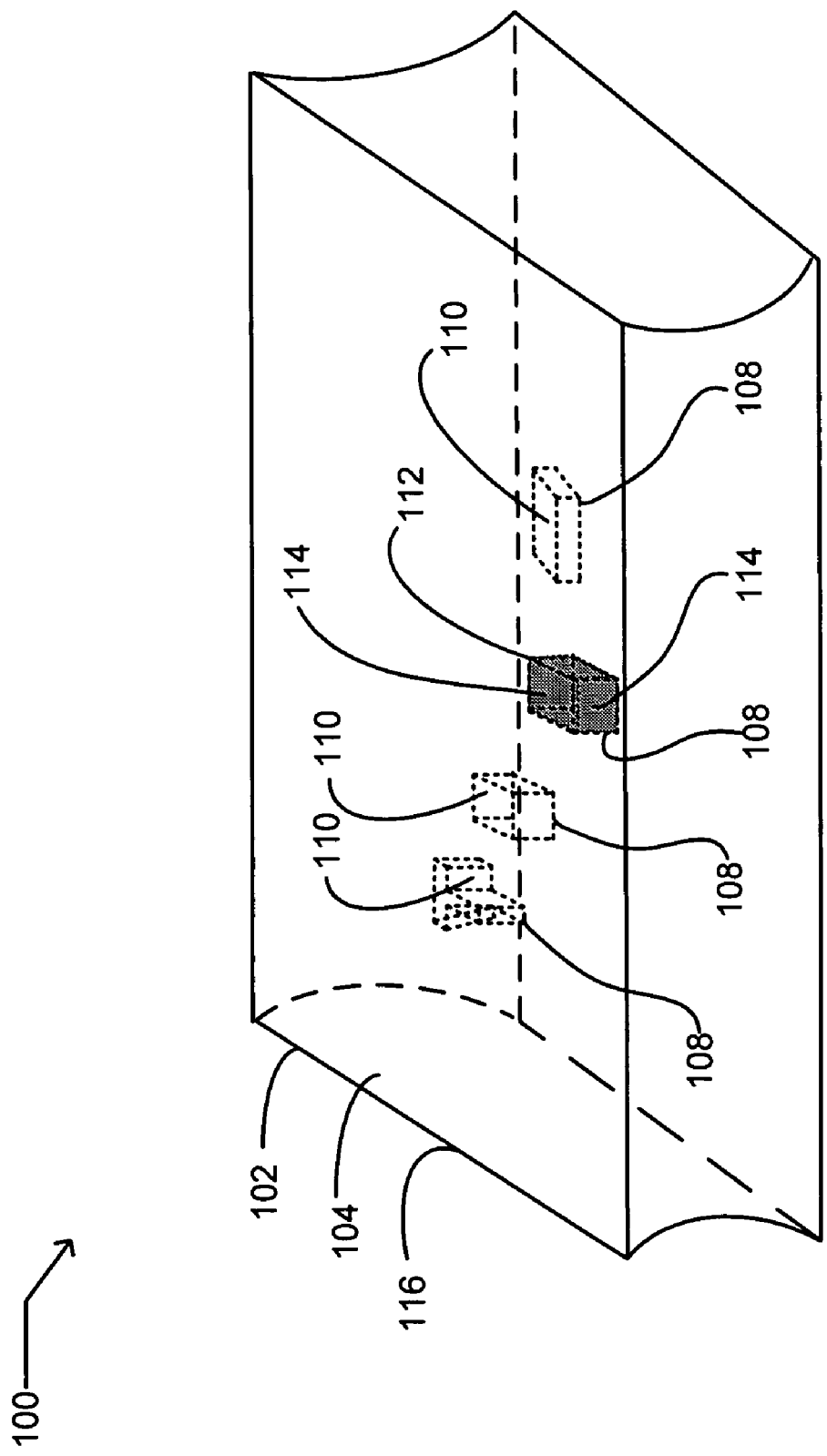

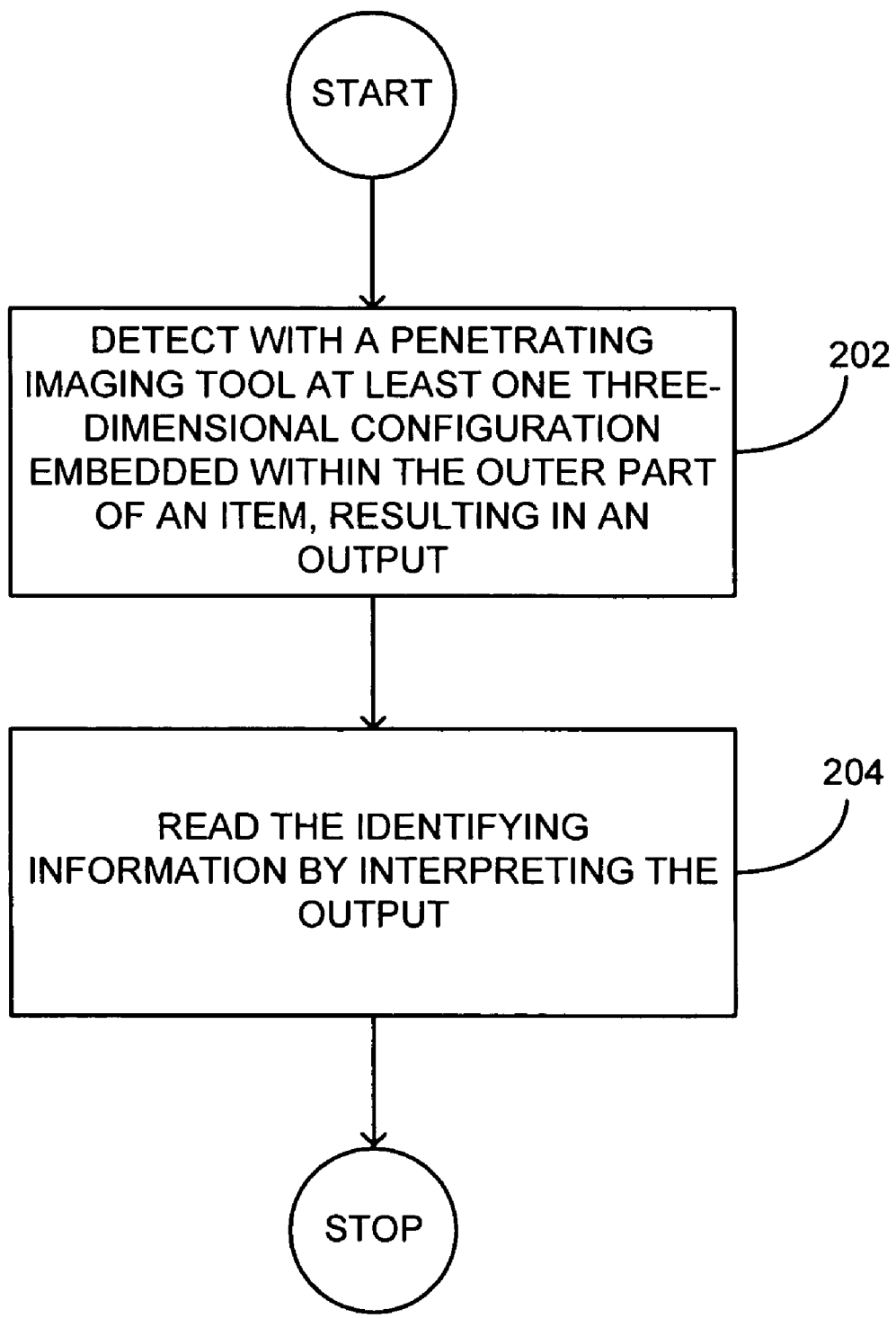

EMBEDDED IDENTIFIERS

FIELD OF THE INVENTION

This present invention generally relates to embedding identifiers in manufactured items.

SUMMARY OF THE INVENTION

According to one embodiment, a manufactured item, includes an outer part including at least one outer material; and an identifier including at least one three-dimensional configuration corresponding to the identifier, the at least one three-dimensional configuration being embedded within the outer part. The three-dimensional configuration includes at least one of (1) a substantially empty cavity in the at least one outer material, and (2) at least one identifying material filling at least part of a cavity in the at least one outer material. Where at least one identifying material fills at least part of a cavity in the at least one outer material, the at least one outer material is substantially opaque to visible light. The item may be manufactured using one of the processes generally known as rapid prototyping, but other manufacturing processes may be used as well.

Another embodiment includes a method of making an item. This embodiment includes forming at least one portion of the item from one or more structural materials, and integrally with that forming step, enclosing within the one or more structural materials identifying information. The identifying information includes at least one three-dimensional configuration that corresponds to the identifying information.

Other embodiments are described in the detailed description of the figures.

BRIEF DESCRIPTION OF THE FIGURES

FIG. 1B is an isometric view according to an embodiment of the invention.

FIG. 2 is a flow chart depicting a method according to an embodiment of the invention.

DETAILED DESCRIPTION OF THE FIGURES

Figure 1A:
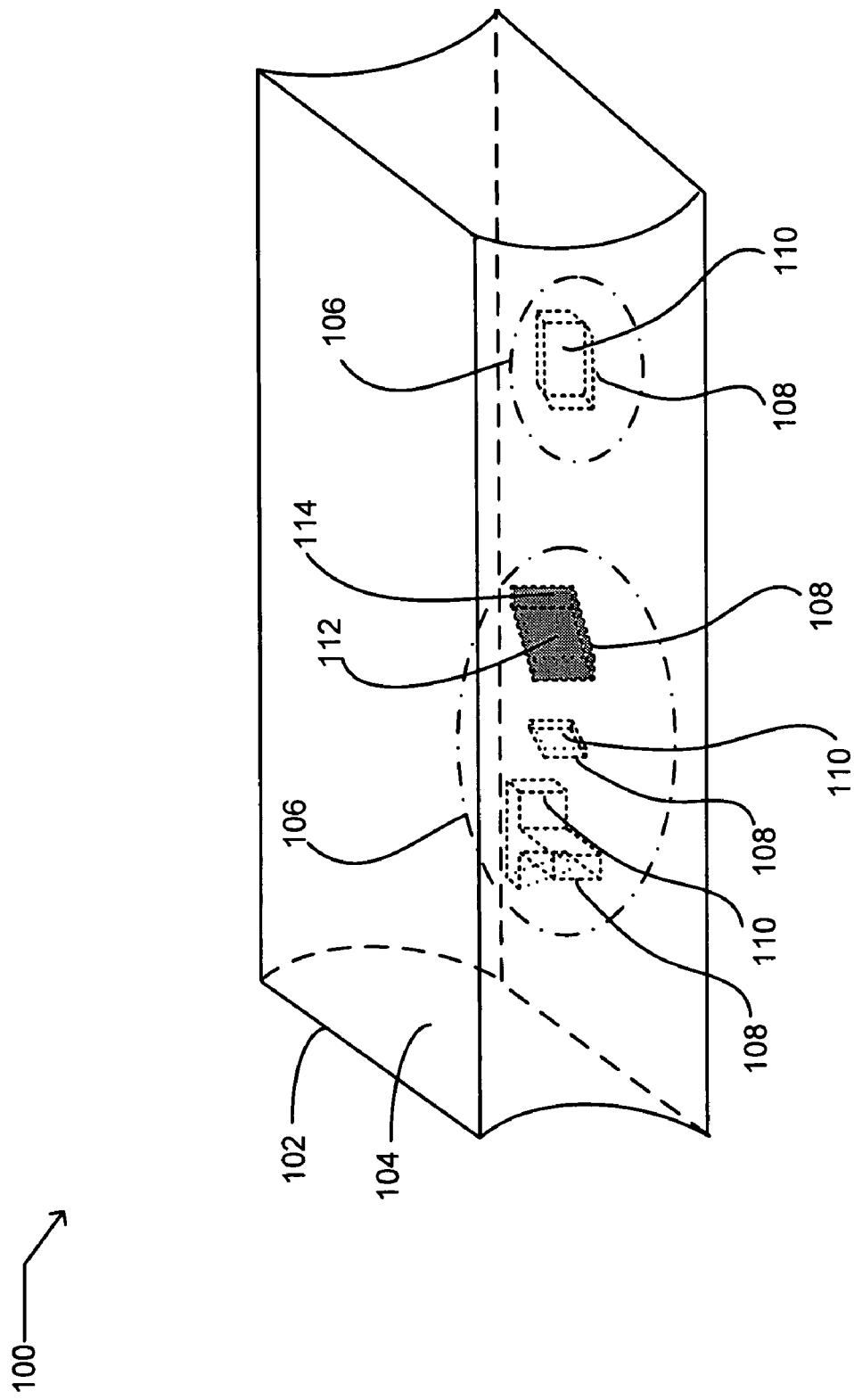
FIG. 1A is an isometric view according to an embodiment of the invention.

FIG. 1A shows one embodiment, an item 100 that includes an outer part 102 that itself includes at least one outer material 104, and an identifier 106 that includes at least one three-dimensional configuration 108 corresponding to the identifier 106. In FIG. 1A, the exterior of item 100 is shown with edges of the item 100 obstructed from view by the body of item 100, shown as broken lines. In addition, FIG. 1A shows internal features, the identifier 106 and three-dimensional configurations 108, outlined in broken lines. The oval broken outlines representing the identifiers 106 contain representative three-dimensional configuration or configurations 108. The three-dimensional configuration or configurations 108 are embedded within the outer material or materials 104. The three-dimensional configuration or configurations 108 are either (1) a substantially empty cavity or cavities 110 in the outer material or materials 104, or (2) one or more identifying materials 112 that fill part or all of a cavity 114 in the outer material or materials 104, or both (1) and (2).

The substantially empty cavities 110, the identifying material or materials 112, and the cavity 114 filled by one or more identifying materials 112 are indicated as the interiors of the three-dimensional configurations 108. In this embodiment, where one or more of the three-dimensional configuration or configurations 108 include an identifying material or materials 112, filling all or part of the outer material or materials 104, the outer material or materials 104 are substantially opaque to visible light The item 100 may be constructed such that three-dimensional configuration 108 is partially or completely surrounded by one or more first outer materials 104, which one or more first outer materials 104 are themselves partially or completely surrounded by one or more second outer materials 104. In a preferred embodiment, the item is the product of fabrication process generally known as rapid prototyping, but the skilled artisan will recognize that the invention is not limited to that fabrication process.

The identifier 106 may include a variety of types of information, such as information that identifies the item uniquely (e.g., a unique alphanumeric character sequence), information that identifies the item as a member of a set of similar items (e.g., an alphanumeric character sequence that identifies the item as a product made under license to a particular business entity, or as a product made any a particular manufacturer). The three-dimensional configuration or configurations 108 that correspond to the identifier 106 may be literal depictions of alphanumeric characters, or they may be shapes that correspond to the identifier 106 that are not ascertainable as such upon visual inspection. Those who wish to copy an item that represents this embodiment may not discern the significance or the meaning of the three-dimensional configuration or configurations 108 if those configurations 108 are detected in an item to be copied. As such, the configurations 108 provide a means of detecting unauthorized copies of item embodiments.

In an aspect of this embodiment, the configuration or configurations 108 are completely enclosed by the outer material or materials 104. In another aspect of this embodiment, the configuration or configurations 108 are directly accessible by physically separating the portion or portions 116 into at least two parts, e.g., by cutting the portion or portions 116 apart. In still another aspect of this embodiment, the configuration or configurations 108 are directly accessible only by physically separating the portion or portions 116 into at least two parts. In yet another aspect of this embodiment, the configuration or configurations 108 are directly accessible only by disassembling the item 100. FIG. 1B, shows one portion 116 of item 100 after separation such that an outer surface (in FIG. 1B, the upper surface) cuts across the three-dimensional configurations 108 indicated in FIG. 1A. This view is shown for convenience of exposition; portions 116 may include but are not limited to portions with surfaces that cut across the three-dimensional configurations of the item 100. The surfaces of the three-dimensional configurations 108 that are not visible from the vantage point of FIG. 1B are shown by broken lines, and the substantially empty cavities 110, identifying material or materials 112, and the cavity filled by the identifying material or materials 114 are indicated as the interiors of the three-dimensional configurations 108, visible at the upper surface of the portion 116.

In another aspect of this embodiment, the configuration or configurations 108 are detectable without direct access. In this aspect, the configuration or configurations 108 are detectable with a penetrating imaging tool. Such a penetrating imaging tool may include, for example, an x-ray imager, a magnetic resonance imager, or an acoustic imager. An acoustic penetrating imaging tool for detecting the configuration or configurations 108 may emit acoustic energy and detect an acoustic signature in response to the emitted acoustic energy. The three-dimensional configuration or configurations 108, the identifying material or materials 112, and the way in which the identifying material or materials fill at least part of the three-dimensional configuration or configurations 108 may be selected or designed to resonate, reflect, diffract, or otherwise respond to the exposure of electromagnetic ("EM") or acoustic energy in specific ways that correspond to the identifier or identifiers 106. Those skilled in the art will recognize that detection of the configurations 108 without direct access is not limited to the examples described here.

The identifying material or materials 112 of this embodiment may include an identifying material 112 that emits identifying EM energy when irradiated with specified EM energy. For example, the included identifying material 112 may be a re-radiating antenna that emits particular identifying EM radiation (e.g., EM radiation of a specified frequency and/or duration, or encoded with specific information) when it is irradiated with particular EM radiation. Similarly, the identifying material or materials 112 may include security tags or radio-frequency identification devices ("RFIDs") that respond with identifying EM radiation when irradiated with particular EM radiation. Re-radiating antennas, security tags, and RFIDs are well known in the art and are cited as exemplary identifying materials 112 for use in this embodiment of the invention. In still another aspect, the identifying material may have a non-RF type of emission. For example, the three-dimensional configuration or configurations 108 may be transmissive to a selected first optical wavelength, such as an infrared or ultraviolet wavelength. The identifying material or materials 112 may then be of a substance that emits a different wavelength in response. For example, the identifying material or materials 112 may be a phosphor, inorganic, or organic material that emit light of a detectable wavelength when illuminated with the first optical wavelength. The skilled artisan will recognize that such the substantially empty cavity or cavities 110 and the identifying materials 112 and other similar identifying materials 112 may be used singly or in combination to complement each other to identify the item 100 or redundantly to provide more than one way to identify the item 100.

Another embodiment according to the invention, shown in FIG. 2 is a method of identifying the item described in connection with FIGS. 1A and 1B. The embodiment includes detecting the three-dimensional configuration or configurations 108 with a penetrating imaging tool, the detecting resulting in an output (step 202), and reading the identifying information by interpreting the output (step 204). Step 204 may be performed by a person or mechanically, electronically, or computationally. In one example, the output may include a series of numbers or other identifying elements that, alone, may not provide usable information to a user. However, applying an algorithm to the sequence of elements may provide the desired information. For example, the sequence may have an internal correlation that validates the item 100, in much the same fashion as a key code on distributed software.

Figure 3:
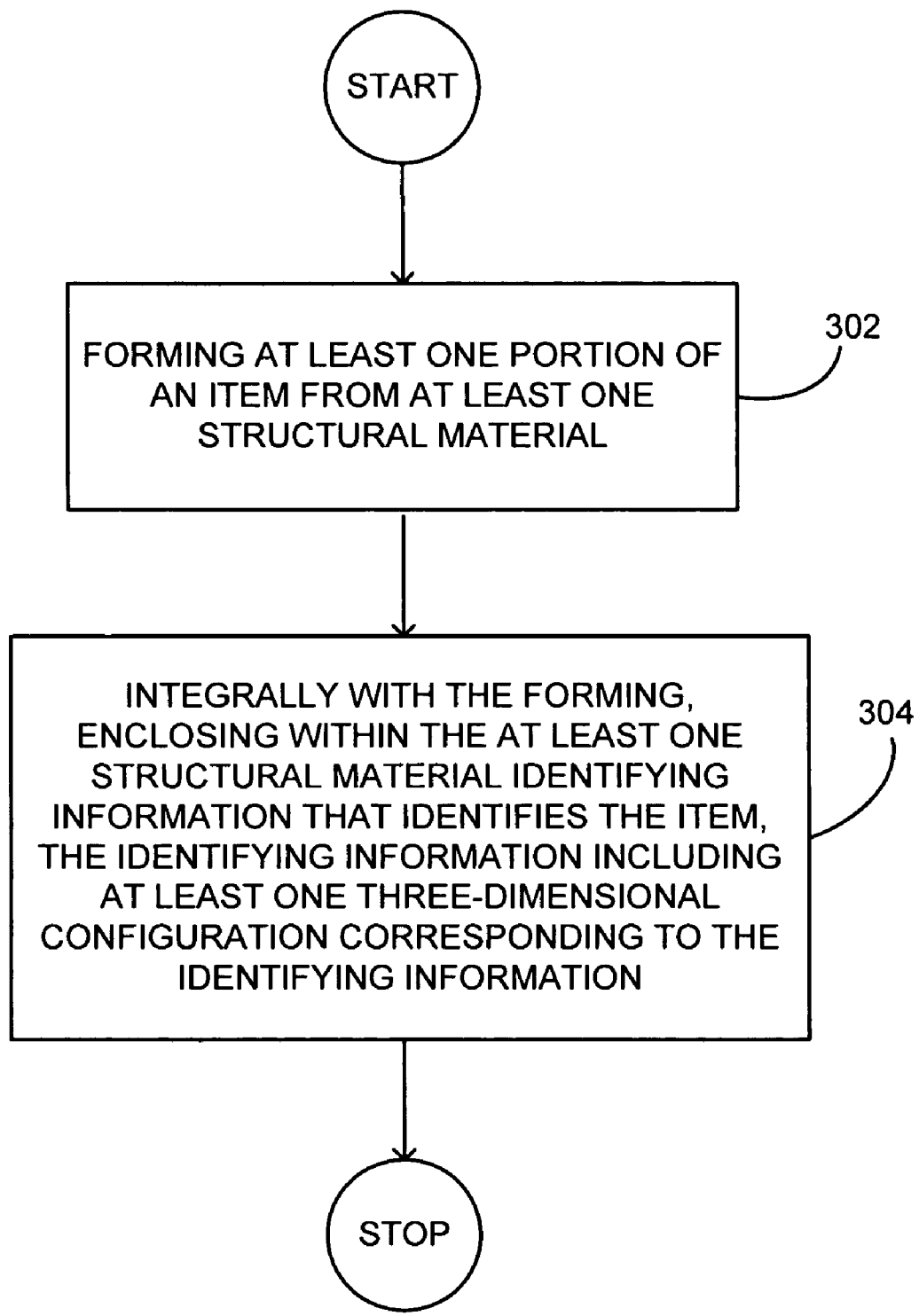
FIG. 3 is a flow chart depicting a method according to an embodiment of the invention.

FIG. 3 is a flow chart depicting another embodiment according to the invention, a method of making an item. This method includes forming at least one portion of the item from one or more structural materials (step 302), and integrally with that forming step, enclosing within the one or more structural materials identifying information (step 304). The identifying information includes at least one three-dimensional configuration that corresponds to the identifying information. The one or more three-dimensional configurations includes either (1) one or more voids defined by the structural material and substantially shaped as the one or more three-dimensional configurations that correspond to the identifying information or (2) one or more identifying materials substantially shaped as the one or more three-dimensional configurations in the structural material or materials, or both (1) and (2). Where one or more of the three-dimensional configurations include an identifying material, the structural material or materials are preferably substantially opaque to visible light.

Figure 4:
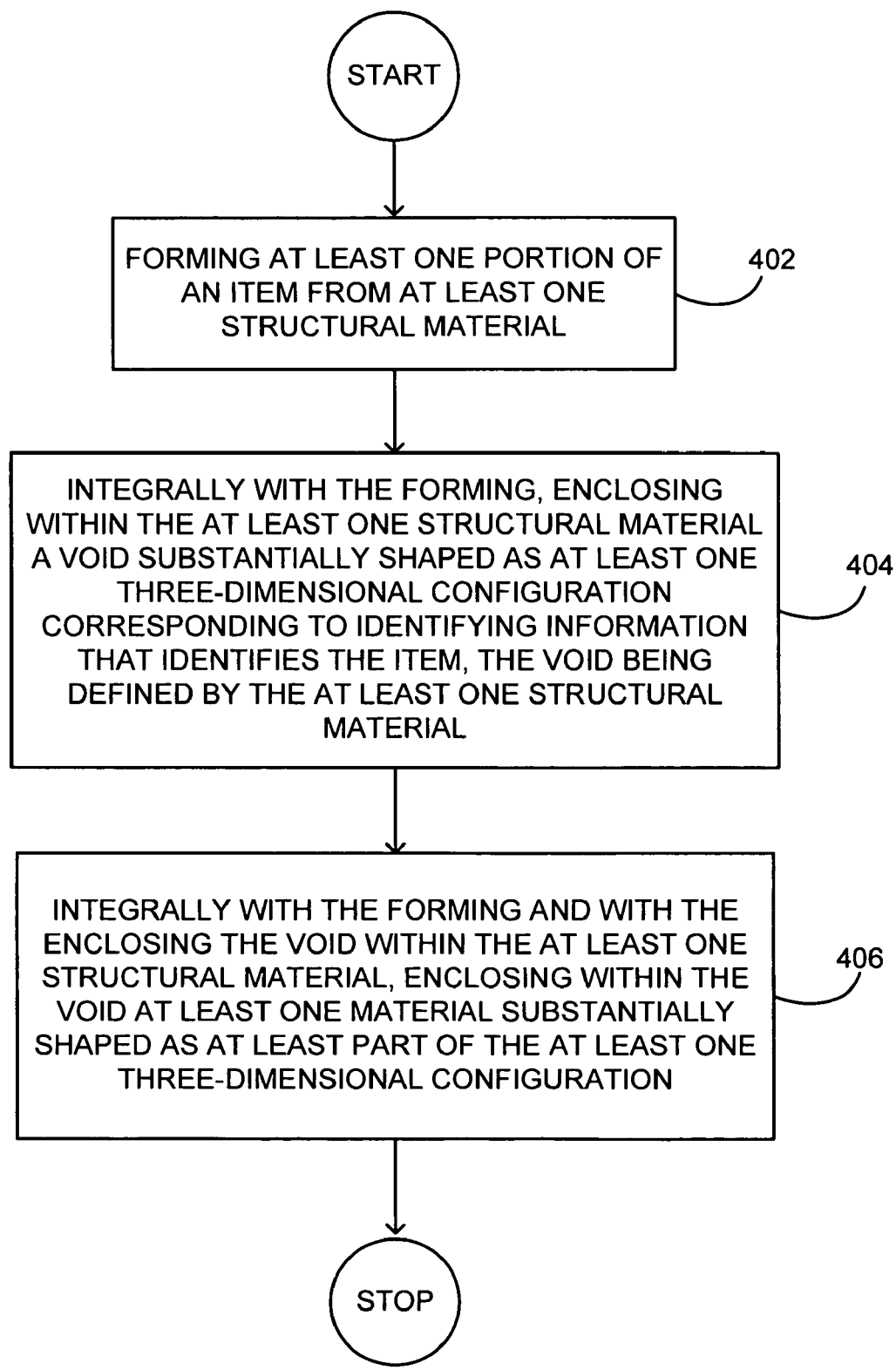
FIG. 4 is a flow chart depicting a method according to an embodiment of the invention.

Turning now to FIG. 4, a flow chart shows another embodiment of a method of making an item. The method includes forming one or more portions of the item from one or more structural materials (step 402) and, integrally with the forming the one or more portions, enclosing within the one or more structural materials a void substantially shaped as one or more three-dimensional configurations that correspond to identifying information that identifies the item (step 404). The void is defined by the structural material or materials. In one aspect of this embodiment, also shown in FIG. 4, integrally with forming the portion or portions of the item and with the enclosing the void within the one or more structural materials, an identifying material or materials are enclosed with the void (step 406). In this aspect of the embodiment, the identifying material or materials are substantially shaped as the one or more three-dimensional configurations.

Figure 5:
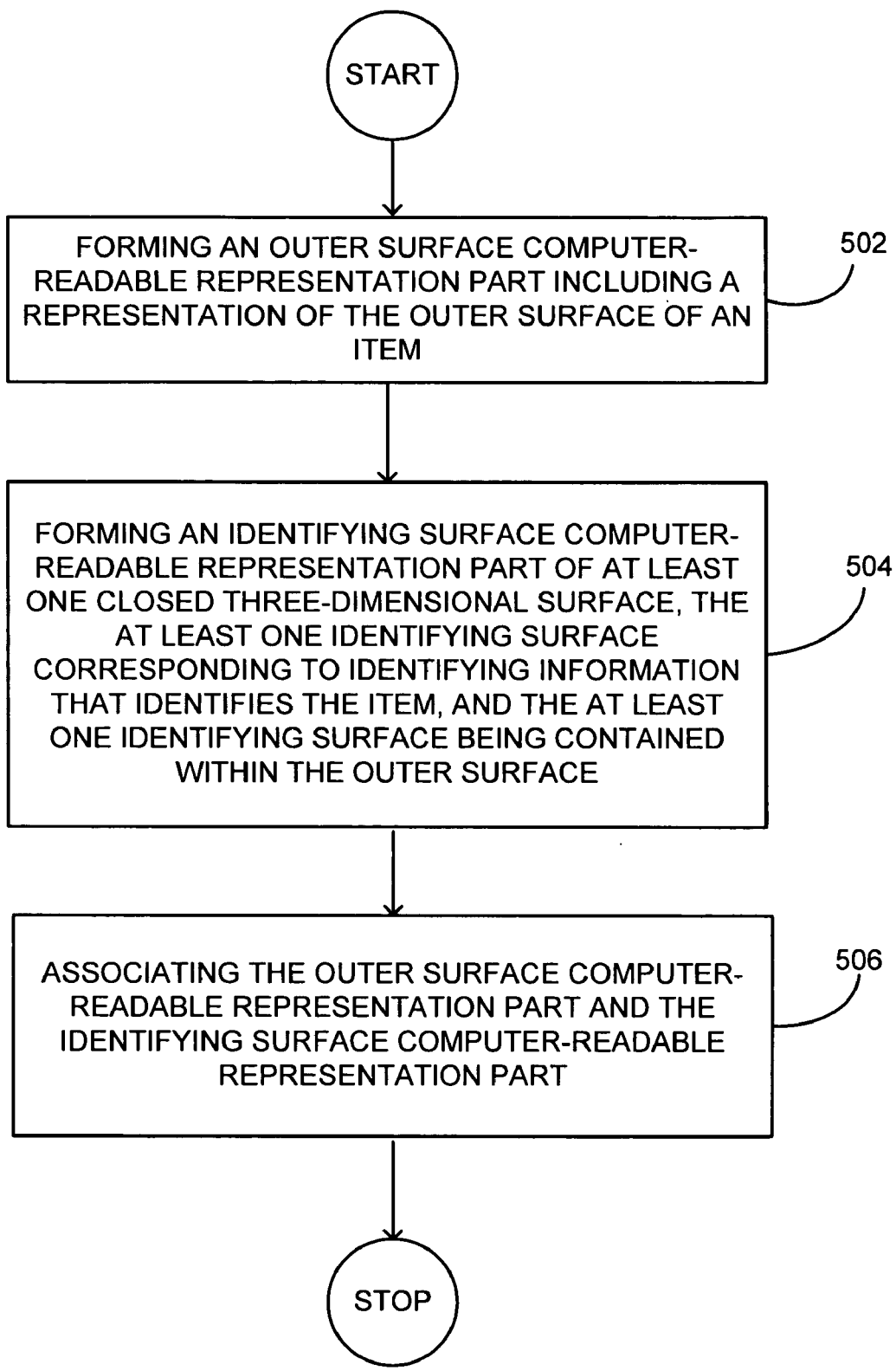
FIG. 5 is a flow chart depicting a method according to an embodiment of the invention.

FIG. 5 depicts in a flow chart another method of forming a computer-readable representation of an item including forming an outer surface computer-readable representation part including a representation of the outer surface of the item (step 502); forming an identifying surface computer-readable representation part of one or more closed three-dimensional identifying surfaces, the identifying surface or surfaces corresponding to identifying information that identifies the item, and the identifying surface or surfaces being contained within the outer surface (step 504); and associating the outer surface computer-readable representation part and the identifying surface computer-readable representation part (step 506).

Figure 6:
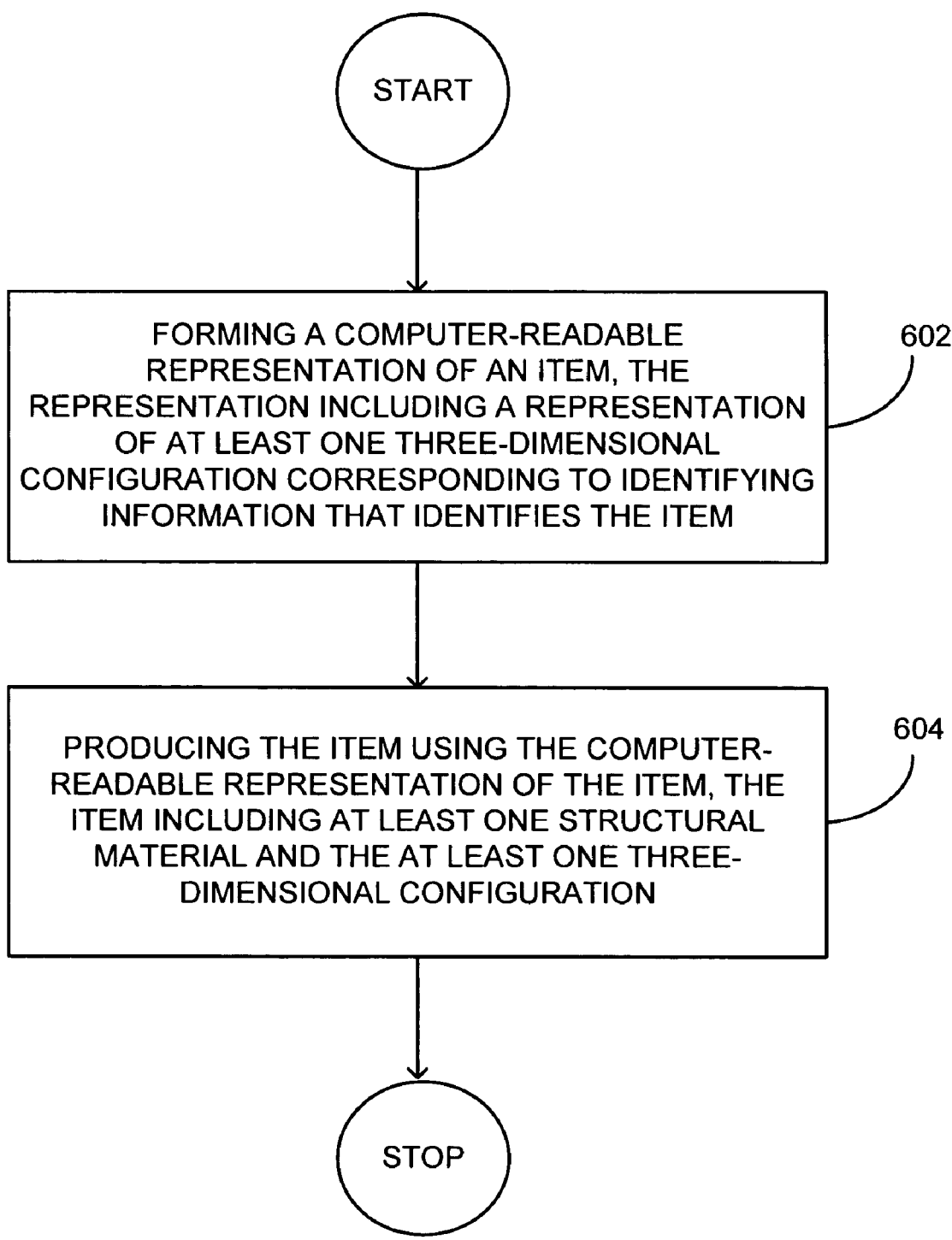
FIG. 6 is a flow chart depicting a method according to an embodiment of the invention.

Another embodiment, a method of making an item, is represented by the flow chart of FIG. 6. This embodiment includes forming a computer-readable representation of the item (step 602). The computer-readable representation of the item includes a representation of at least one three-dimensional configuration that corresponds to identifying information that identifies the item. The method also includes producing the item using the computer-readable representation (step 604). The item so produced includes one or more structural materials and the three-dimensional configuration or configurations. The three-dimensional configuration or configurations include (a) a void within the structural material or materials, or (b) at least one identifying material substantially shaped as part or all of the three-dimensional configuration or configurations and enclosed within the structural material or materials, the structural material or materials enclosing the identifying material being substantially opaque to visible light, or both (a) and (b).

One skilled in the art will recognize that the foregoing components (e.g., steps), devices, and objects in FIGS. 1A, 1B, 2, 3, 4, 5 and 6 and the discussion accompanying them are used as examples for the sake of conceptual clarity and that various configuration modifications are common. Consequently, as used herein, the specific exemplars set forth in FIGS. 1A, 1B, 2, 3, 4, 5 and 6 and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

While particular embodiments have been shown and described, it will be obvious to those skilled in the art that, based upon the teaching herein, changes and modifications may be made without departing from the invention and its broader aspects and, therefore, the appended claims are to encompass within their scope all such changes and modifications as are within the true spirit and scope of this invention. Furthermore, it is to be understood that the invention is solely defined by the appended claims.

Other embodiments are within the following claims.

We claim:

1. An item comprising:
    an outer part including at least one outer material that is substantially opaque to visible light; and
    an identifier including at least one three-dimensional configuration corresponding to the identifier, the at least one three-dimensional configuration being embedded within the at least one outer material and including at least one of
    (1) a substantially empty cavity in the at least one outer material, or
    (2) at least one identifying material filling at least part of a cavity in the at least one outer material and wherein the at least one outer material in which the at least one identifying material fills at least part of the cavity is substantially opaque to visible light.

2. The item of claim 1, wherein the at least one outer material is transmissive to RF radiation.

3. The item of claim 1, wherein the item is produced by rapid prototyping.

4. The item of claim 1, wherein the identifier identifies the item as a member of a set of similar items.

5. The item of claim 1, wherein the identifier identifies the item uniquely.

6. The item of claim 1, wherein the at least one three-dimensional configuration is completely enclosed by the at least one outer material.

7. The item of claim 1, wherein the at least one three-dimensional configuration is directly accessible by physically separating the at least one outer material into at least two parts.

8. The item of claim 1, wherein the at least one three-dimensional configuration is directly accessible only by disassembling the item.

9. The item of claim 1, wherein the at least one identifying material emits identifying electromagnetic radiation when irradiated with specified electromagnetic radiation.

10. The item of claim 9, wherein the identifying material comprises a re-radiating antenna.

11. The item of claim 9, wherein the identifying material comprises a security tag.

12. The item of claim 9, wherein the identifying material comprises a radio-frequency identification device.

13. A method of identifying an item comprising:
    detecting an at least one three-dimensional configuration with a penetrating imaging tool, the detecting an at least one three-dimensional configuration with a penetrating imaging tool resulting in an output from the penetrating imaging tool; and
    reading identifying information by interpreting the output.

14. The method of claim 13, wherein the detecting an at least one three-dimensional configuration with a penetrating imaging tool includes:
    detecting an at least one three-dimensional configuration with an x-ray imager.

15. The method of claim 13, wherein the detecting an at least one three-dimensional configuration with a penetrating imaging tool includes:
    detecting an at least one three-dimensional configuration with a magnetic-resonance imager.

16. The method of claim 13, wherein the detecting an at least one three-dimensional configuration with a penetrating imaging tool includes:
    detecting an at least one three-dimensional configuration with an acoustic imager.

17. The method of claim 13, wherein the detecting an at least one three-dimensional configuration with a penetrating imaging tool includes:
    emitting acoustic energy and detecting an acoustic signature in response to the emitted acoustic energy.

18. The method of claim 13, wherein the reading identifying information by interpreting the output includes:
    reading identifying information from at least one identifying material emitting identifying electromagnetic radiation when irradiated with specified electromagnetic radiation.

19. The method of claim 18, wherein the reading indentifying information from at least one identifying material includes:
    reading identifying information from a re-radiating antenna.

20. The method of claim 18, wherein the reading indentifying information from at least one identifying material includes:
    reading identifying information from a security tag.

21. The method of claim 18, wherein the reading indentifying information from at least one identifying material includes:
    reading identifying information from a radio-frequency identification device.

22. A method of making an item, the method comprising:
    forming at least one portion of the item from at least one structural material; and
    integrally with said forming the at least one portion, enclosing within the at least one structural material identifying information that identifies the item, the identifying information including at least one three-dimensional configuration corresponding to the identifying information, the at least one three-dimensional configuration including at least one of
    (1) a void substantially shaped as the at least one three-dimensional configuration, the void defined by the at least one structural material, or
    (2) an identifying material substantially shaped as at least part of the at least one three-dimensional configuration, wherein the at least one structural material is substantially opaque to visible light.

23. The method of claim 22, wherein the void is substantially empty.

24. The method of claim 22, wherein the identifying information identifies the item as a member of a set of similar items.

25. The method of claim 24, further including
    validating authorization to produce the item number responsive to the identifying information.

26. The method of claim 24, wherein the set of similar items is a set of at least one item provided by a particular vendor.

27. The method of claim 22, wherein the identifying information identifies the item uniquely.

28. The method of claim 27, wherein the identifying information identifies the item uniquely by including a serial number that is unique to the item.

29. The method of claim 22, wherein the enclosing comprises making the identifying information invisible from outside the item.

30. The method of claim 22, wherein the structural material is substantially opaque to visible light.

31. The method of claim 22, wherein the structural material is a visible light blocking material.

32. The method of claim 22, wherein the enclosing comprises
making the identifying information directly accessible by physically separating the at least one portion into at least two parts.

33. The method of claim 22, wherein the enclosing comprises
making the identifying information directly accessible only by disassembling the item.

34. A method of making an item, the method comprising:
forming at least one portion of the item from at least one structural material; and
integrally with the forming the at least one portion, enclosing within the at least one structural material a void substantially shaped as at least one three dimensional configuration corresponding to identifying information that identifies the item, the void being defined by the at least one structural material.

35. The method of claim 34, further comprising:
integrally with the forming the at least one portion and with the enclosing the void within the at least one structural material, enclosing within the void at least one identifying material substantially shaped as at least part of the at least one three-dimensional configuration.

36. The method of claim 34, wherein the void is substantially empty.

37. A method of forming a computer-readable representation of an item, the method comprising:
forming an outer surface computer-readable representation part including a representation of the outer surface of the item;
forming an identifying surface computer-readable representation part of at least one closed three-dimensional identifying surface, the at least one identifying surface corresponding to identifying information that identifies the item, and the at least one identifying surface being contained within the outer surface; and
associating the outer surface computer-readable representation part and the identifying surface computer-readable representation part.

38. The method of claim 37, the item to be produced using rapid prototyping.

39. The method of claim 37, wherein the outer surface computer-readable representation part comprises
a representation of at least one outer material from which the outer surface is to be shaped.

40. The method of claim 37, wherein the identifying surface computer-readable representation part comprises
a representation of at least one identifying material that is to be placed within the identifying surface.

41. The method of claim 37, wherein the identifying information identifies the item uniquely.

42. The method of claim 37, wherein the identifying information identifies the item as a member of a set of similar items.

43. A method of manufacturing an item, the method comprising:
forming a computer-readable representation of the item, the computer-readable representation including a representation of at least one three-dimensional configuration, the at least one three-dimensional configuration corresponding to identifying information that identifies the item; and
producing the item using the computer-readable representation of the item,
the item including
(1) at least one structural material, and
(2) the at least one three-dimensional configuration, the at least one three-dimensional configuration including at least one of
(a) a void within the at least one structural material, or
(b) at least one identifying material substantially shaped as at least part of the at least one three-dimensional configuration and enclosed within the at least one structural material, wherein the at least one structural material enclosing the at least one identifying material is substantially opaque to visible light.

44. The method of claim 43, wherein the identifying information identifies the item as a member of a set of similar items.

45. The method of claim 43, wherein the identifying information identifies the item uniquely.

46. The method of claim 43, wherein the producing comprises making the at least one three-dimensional configuration invisible from outside the item.

47. The method of claim 43, wherein the producing comprises making the three-dimensional configuration directly accessible by physically separating the at least one portion into at least two part.

48. The method of claim 43, wherein the producing comprises making the three-dimensional configuration directly accessible only by disassembling the item.

* * * * *

UNITED STATES PATENT AND TRADEMARK OFFICE
CERTIFICATE OF CORRECTION

PATENT NO.       : 7,806,339 B2                                    Page 1 of 1
APPLICATION NO.  : 10/802106
DATED            : October 5, 2010
INVENTOR(S)      : Bran Ferren et al.

It is certified that error appears in the above-identified patent and that said Letters Patent is hereby corrected as shown below:

Column 8, Line 50, should read:
-- into at least two parts. --

Signed and Sealed this
Seventeenth Day of May, 2011

David J. Kappos
*Director of the United States Patent and Trademark Office*